June 26, 1962 R. E. SHRIMPLIN 3,040,707
ANIMAL SELF-FEEDER
Filed April 10, 1961

INVENTOR.
Ray Elmer Shrimplin
BY
Hovey, Schmidt, Johnson & Hovey
ATTORNEYS.

3,040,707
ANIMAL SELF-FEEDER
Ray Elmer Shrimplin, R.R. 2, Westphalia, Kans.
Filed Apr. 10, 1961, Ser. No. 102,022
6 Claims. (Cl. 119—53.5)

This invention relates to cattle feeders of a type particularly adapted to provide a readily available source of free choice of feed for cattle. In the production of beef for commercial purposes, it is desirable to obtain as high a daily weight gain on each animal as is possible. During a phase of such production, cattle are normally "full fed," i.e., encouraged to eat as much feed as they will to encourage the rate of weight gain.

One important factor contributing to greater feed consumption is the availability of the ration to the animals at all times. The cattle inherently have a tendency to be reluctant to open doors or hold them open with their heads or noses. Consequently, conventional types of self-feeders have retarded, rather than increased, the rate of gain when employed for feeding cattle. Heretofore it has been necessary to maintain an open supply of feed for the cattle, often resulting in expensive loses from wind and birds, as well as contamination of the grain by dust and rain. My invention eliminates these sources of loss by providing an enclosed, yet readily available supply of cattle feed.

Accordingly, it is the most important object of this invention to provide a feeder for cattle having doors equipped with means operable by the cattle themselves for obtaining access to food stored therein.

Yet a further important object of my instant invention is to provide a feeder having doors which automatically remain in the closed position except while the animals are selectively feeding.

Another important object of my invention is to provide such a feeder having doors which may be opened without being contacted by the head of the animal.

Still another important object of the present invention is the provision of a feeder having doors which are easily held in the open position by the animal while the latter is feeding.

A yet further important object is to provide a feeder having access means of such sturdy construction as to be resistant to bending or breaking by contact with the animals.

A further object of this invention is to provide access means which may be adjusted to accommodate various sized cattle.

Figure 2:
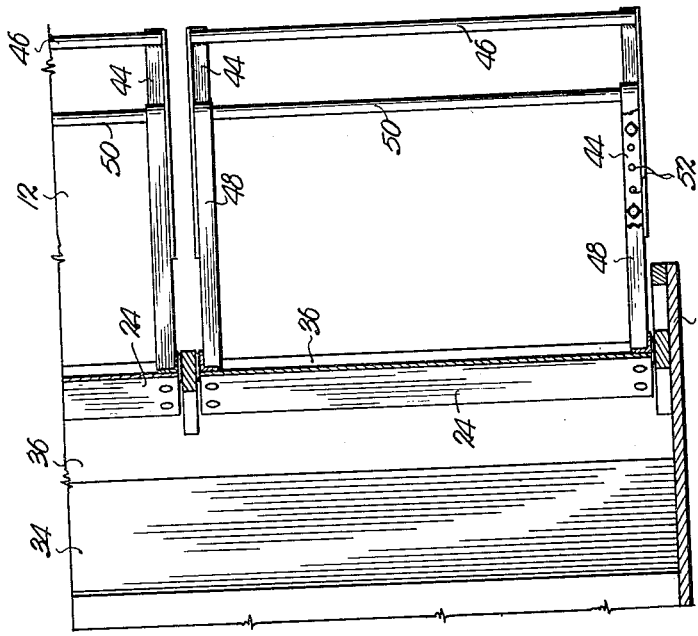
Figure 3:
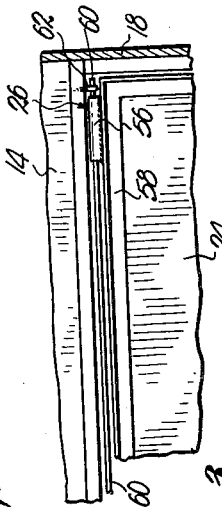
Figure 1:
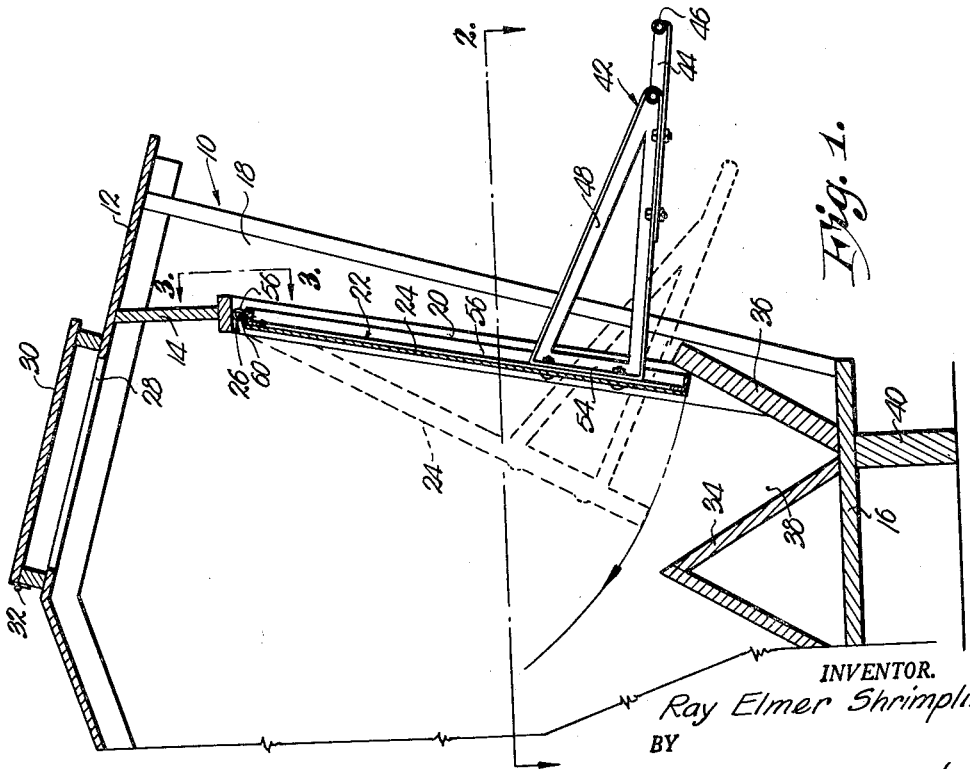

In the drawing:
FIGURE 1 is a fragmentary, vertical, cross-sectional end elevational view of the feeder which is the subject of the instant invention;
FIG. 2 is a fragmentary, cross-sectional, plan view taken along line 2—2 of FIG. 1, with parts broken away for clearness; and
FIG. 3 is a fragmentary, enlarged, elevational view along line 3—3 of FIG. 1.

A building broadly designated 10, includes a roof 12, a side 14, a bottom 16, and a protruding end 18. It will be understood that identical sides and ends (not shown) are provided oppositely disposed from side 14 and end 18 to completely enclose building 10. An opening 20 in side 14 is provided with a closure broadly designated 22, comprising a generally upright door 24 of sheet metal or the like, pivotally suspended along its upper edge by hinge means 26. Roof 12 has a port 28 covered by a hatch 30 pivotally mounted at one end by hinge 32.

A V-shaped baffle 34 rises from bottom 16 and joins an inclined member 36 which lies beneath door 24 to form a V-shaped feed bunk 38 disposed adjacent the bottom of door 24. Bottom 16 rests upon a plurality of skids 40 (one of which is shown).

Closure 22 carries operating means broadly designated 42, comprising a pair of spaced arms 44 projecting outwardly from door 24 and interconnected at the outermost end with a bar 46. The opposite ends of arms 44 are releasably secured to door 24 as by bolts or the like. A pair of diagonal braces 48 have one end secured to door 24 and the other end secured to arms 44 inwardly from bar 46.

The braces 48 may be interconnected by a bar 50 to provide additional stability to operating means 42. Each arm 44 is constructed in two sections and is provided with adjusting means in the nature of a plurality of holes 52 for lengthening or shortening the distance of bar 46 from door 24. It will be understood that arms 44 and braces 48 may be interconnected with a section 54 to provide additional stability to operating means 42, and that the latter may be adjusted vertically on door 24 to vary the distance between rod 46 and the ground.

Building 10 may be constructed of sheet metal, wood or other suitable building material. If wood is used, hinge means 26 will preferably be made from a length of pipe or the like 56, welded to a metal frame 58 around the perimeter of door 24 and mounting rod 60. The latter is disposed through an eyebolt 62 which is securely fastened in the wooden framework of side 14. When the building 10 is constructed of sheet metal, hinge means 26 will preferably include a pair of pipe lengths welded to building 10 and disposed on either side of pipe 56. Rod 60 will be disposed through all three lengths of pipe, thereby providing a very sturdy hinge.

In operation, building 10 will be placed where it is accessible to cattle. Suitable feed for the cattle may be placed within the building through port 28 beneath hatch 30. Baffle 34 is disposed to direct the feed into bunk 38 where it may be reached through opening 20. The feed is protected from the elements and birds by the protruding ends 18 and the overhanging roof 12, as well as side 14 and door 24.

When cattle are desirous of eating however, they may operate door 24 by swinging it to the open position indicated by dotted lines in FIG. 1. Rod 46 is appropriately disposed in spaced relationship with door 24 so that it will engage the breast of an animal as it approaches door 24. This engagement will cause the door to pivot on hinge means 26. Inasmuch as the pair of arms 44 is disposed in spaced relationship, the swinging of door 24 will present an opening through which the animal may reach the feed within bunk 38. During the time that the animal is feeding, door 24 will be held away from the proximity of the head and nose of the animal, thereby avoiding disturbing it as it eats.

After the animal has finished feeding from within building 10, it will move away, thereby allowing door 24 to return to its closed position. Inasmuch as member 36 is disposed inwardly with respect to hinge 26, the force of gravity will cause door 24 to engage member 36, thereby completely closing opening 20.

Skids 40 provide an effective foundation for the feeder, as well as means for transporting building 10 from one location to another within the feed lot. They may be of a height to dispose bar 46 in proper position for engaging the breast of the cattle to be fed from the feeder.

It will be understood that normally, a plurality of openings 20, each having doors 24 and operating means 42, will be provided in each side of building 10. The number of such openings will depend upon the size of building 10 and the number of cattle to be accommodated.

Having thus described the invention, what is claimed as new and desired to be secured by Letters Patent is:

1. A closure for an opening in a building comprising a generally upright door; means pivotally suspending the door at its upper edge; and operating means on said door projecting outwardly therefrom and adapted to be engaged by cattle or the like for opening the door, said operating means including a pair of rigid, spaced arms, one end of each arm being secured to said closure, and a bar interconnecting the opposite ends of said arms.

2. A closure as set forth in claim 1, wherein said bar is spaced above the ground at a height whereby it may be engaged by the breast of an animal.

3. A closure as set forth in claim 1, wherein each arm is provided with a rigid brace having one end thereof secured to said arm intermediate the ends of the latter and the other end thereof secured to said closure and spaced from said one end of said arm.

4. A closure set forth in claim 1, wherein each of said arms is provided with means for adjusting the distance between said closure and said bar.

5. A closure as set forth in claim 1, wherein said bar, closure and arms are disposed to bound a space large enough to receive the head of a cow therethrough to permit feeding of the latter.

6. A cattle self-feeder comprising a building having an opening in at least one wall thereof; closure means for said opening carried by said building, said closure means comprising a generally upright door and means pivotally suspending the door at its upper edge; a pair of rigid, spaced arms having one end of each arm secured to said closure; a horizontally disposed bar interconnecting the other ends of said arms and spaced above the ground at a height whereby it may be engaged by the breast of an animal; a rigid brace for each arm having one end thereof secured to said arm intermediate the ends of the latter and the other end thereof secured to said closure and spaced from said one end of said arm; means for adjusting the distance between said closure and said bar; and a member on said building disposed inwardly with respect to said pivot means whereby the weight of said door causes the latter to engage said member when the door is in a closed position.

References Cited in the file of this patent
UNITED STATES PATENTS
1,297,743   Simmons _____ Mar. 18, 1919